(12) United States Patent
Chen

(10) Patent No.: US 9,709,713 B1
(45) Date of Patent: Jul. 18, 2017

(54) HIGH QUALITY TELESCOPE MIRRORS MADE FROM POLYMER MATRIX COMPOSITE MATERIALS AND METHOD

(71) Applicant: Peter C. Chen, Columbia, MD (US)

(72) Inventor: Peter C. Chen, Columbia, MD (US)

(*) Notice: Subject to any disclaimer, the term of this patent is extended or adjusted under 35 U.S.C. 154(b) by 0 days.

(21) Appl. No.: 14/743,184

(22) Filed: Jun. 18, 2015

Related U.S. Application Data

(60) Provisional application No. 62/013,619, filed on Jun. 18, 2014.

(51) Int. Cl.
| | |
|---|---|
| *G02B 5/08* | (2006.01) |
| *G02B 23/02* | (2006.01) |
| *G02B 26/08* | (2006.01) |
| *G02B 1/10* | (2015.01) |
| *B29C 67/00* | (2017.01) |

(Continued)

(52) U.S. Cl.
CPC .......... *G02B 5/0841* (2013.01); *B29C 37/006* (2013.01); *B29C 39/123* (2013.01); *B29C 67/007* (2013.01); *B29C 71/02* (2013.01); *B29D 11/00596* (2013.01); *G02B 1/10* (2013.01); *G02B 23/02* (2013.01); *G02B 26/0841* (2013.01); *B29C 2071/022* (2013.01); *B29K 2063/00* (2013.01); *B29K 2105/16* (2013.01); *B29K 2105/18* (2013.01); *B29K 2505/00* (2013.01); *B29K 2505/02* (2013.01); *B29K 2505/12* (2013.01); *B29K 2507/04* (2013.01); *B29K 2995/003* (2013.01); *B29K 2995/0082* (2013.01); *B29L 2009/005* (2013.01); *B29L 2011/0058* (2013.01)

(58) Field of Classification Search
CPC . B29C 37/0025; B29C 39/123; G02B 5/0816; G02B 5/0875; G02B 5/1847
USPC ............ 359/848, 849, 846; 264/1.9, 2.1, 2.3
See application file for complete search history.

(56) References Cited

U.S. PATENT DOCUMENTS

| | | | | |
|---|---|---|---|---|
| 5,607,996 | A | * | 3/1997 | Nichols .................... C08L 7/00 252/511 |
| 5,702,649 | A | * | 12/1997 | Taylor ................ B29C 33/0016 264/1.9 |

(Continued)

OTHER PUBLICATIONS

T. E. Bell, "A Telescope Made of Moondust", NASA Headline News, Jul. 9, 2008, published at http://science.nasa.gov/science-news/science-at-nasa/2008/09jul_moonscope/.

(Continued)

*Primary Examiner* — James Greece
*Assistant Examiner* — Travis Fissel
(74) *Attorney, Agent, or Firm* — Rosenberg, Klein & Lee

(57) ABSTRACT

High quality flexible optical mirrors (in a single or multi-layer implementation) are fabricated from polymer matrix composite material(s) by replication, cast-spinning, and 3-D printing processes. These mirrors are suited as controllable mirrors for different applications including telescope mirrors. The mirrors made from "smart" materials (carbon nanotubes in epoxy) attain controlled properties that may be changed by application of external stimuli, including stress, temperature, moisture, electric and magnetic fields, as well as electromagnetic fields. When formed with non-ferrous metal particles embedded in epoxy, the mirrors are suited for cryogenic operations. The mirrors formed with the ferromagnetic/epoxy material can be deformed and steered by magnetic or electromagnetic fields.

20 Claims, 11 Drawing Sheets

(51) Int. Cl.
  *B29C 39/12* (2006.01)
  *B29C 37/00* (2006.01)
  *B29D 11/00* (2006.01)
  *B29C 71/02* (2006.01)
  *B29L 11/00* (2006.01)
  *B29L 9/00* (2006.01)
  *B29K 63/00* (2006.01)
  *B29K 105/16* (2006.01)
  *B29K 105/18* (2006.01)
  *B29K 507/04* (2006.01)
  *B29K 505/00* (2006.01)
  *B29K 505/02* (2006.01)
  *B29K 505/12* (2006.01)

(56) References Cited

U.S. PATENT DOCUMENTS

| | | | | |
|---|---|---|---|---|
| 5,714,563 A * | 2/1998 | DePompei | | C08G 18/10 524/705 |
| 7,727,450 B1 * | 6/2010 | Berger | | B29C 33/40 264/266 |
| 8,034,263 B2 | 10/2011 | Maass | | |
| 2003/0223135 A1 * | 12/2003 | Carreras | | F24J 2/125 359/846 |
| 2005/0200984 A1 * | 9/2005 | Browne | | B60R 1/08 359/846 |
| 2006/0141042 A1 | 6/2006 | Kuroda et al. | | |
| 2007/0077323 A1 * | 4/2007 | Stonesmith | | B33Y 30/00 425/174.4 |
| 2008/0030824 A1 * | 2/2008 | Griffith | | G02B 26/0825 359/224.1 |
| 2009/0148095 A1 | 6/2009 | Pesetski et al. | | |
| 2010/0033702 A1 | 2/2010 | Rigato | | |
| 2010/0160792 A1 * | 6/2010 | Furnish | | A61B 5/0062 600/479 |
| 2012/0162772 A1 | 6/2012 | Stern et al. | | |
| 2012/0170012 A1 * | 7/2012 | Masaki | | G02B 5/0816 355/67 |
| 2012/0220695 A1 * | 8/2012 | Mao | | C08K 7/24 523/468 |
| 2012/0245284 A1 * | 9/2012 | Leong | | C08G 59/50 524/714 |
| 2012/0328811 A1 * | 12/2012 | Patel | | C09D 4/00 428/36.9 |
| 2013/0231408 A1 * | 9/2013 | O'Brien | | C08J 5/18 521/47 |

OTHER PUBLICATIONS

M. Harwit, "Neugebauer, Martz and Leighton's observations of extremely cool stars", Astrophysical Journal, 525 (1999), pp. 1063-1064.

F. J. Schmidt, "Electroforming of Large Mirrors", Applied Optics, 5(5) (May 1966), pp. 719-725.

"Heliophysics Science and the Moon" Chapter 4, NASA Report, Sep. 2004.

P. C. Chen et al., "Moon Dust Telescopes, Solar Concentrators, and Structures", presentation before the American Astronomical Society, Jun. 2008.

* cited by examiner

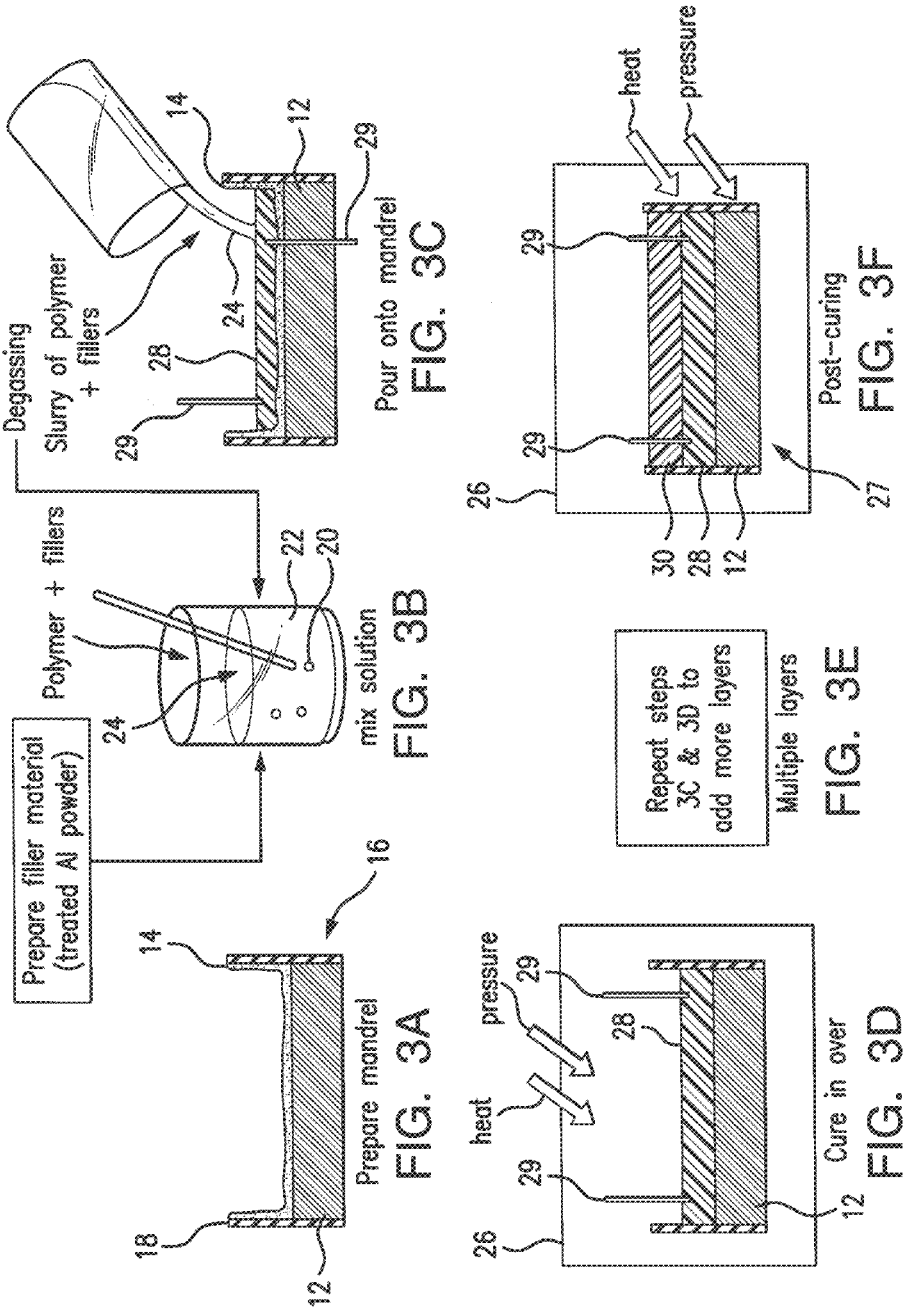

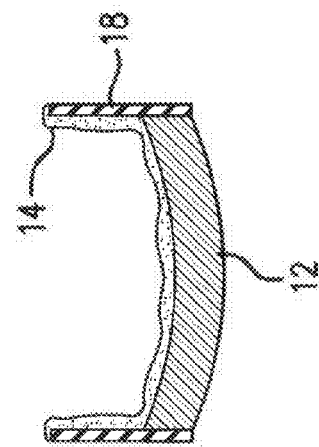
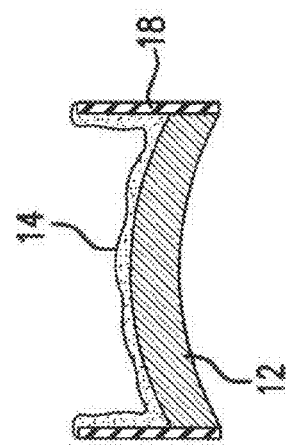
FIG. 3H
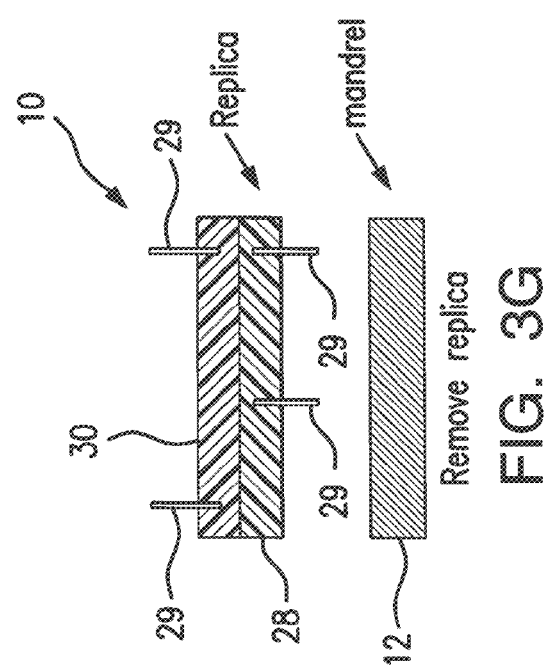
FIG. 3G

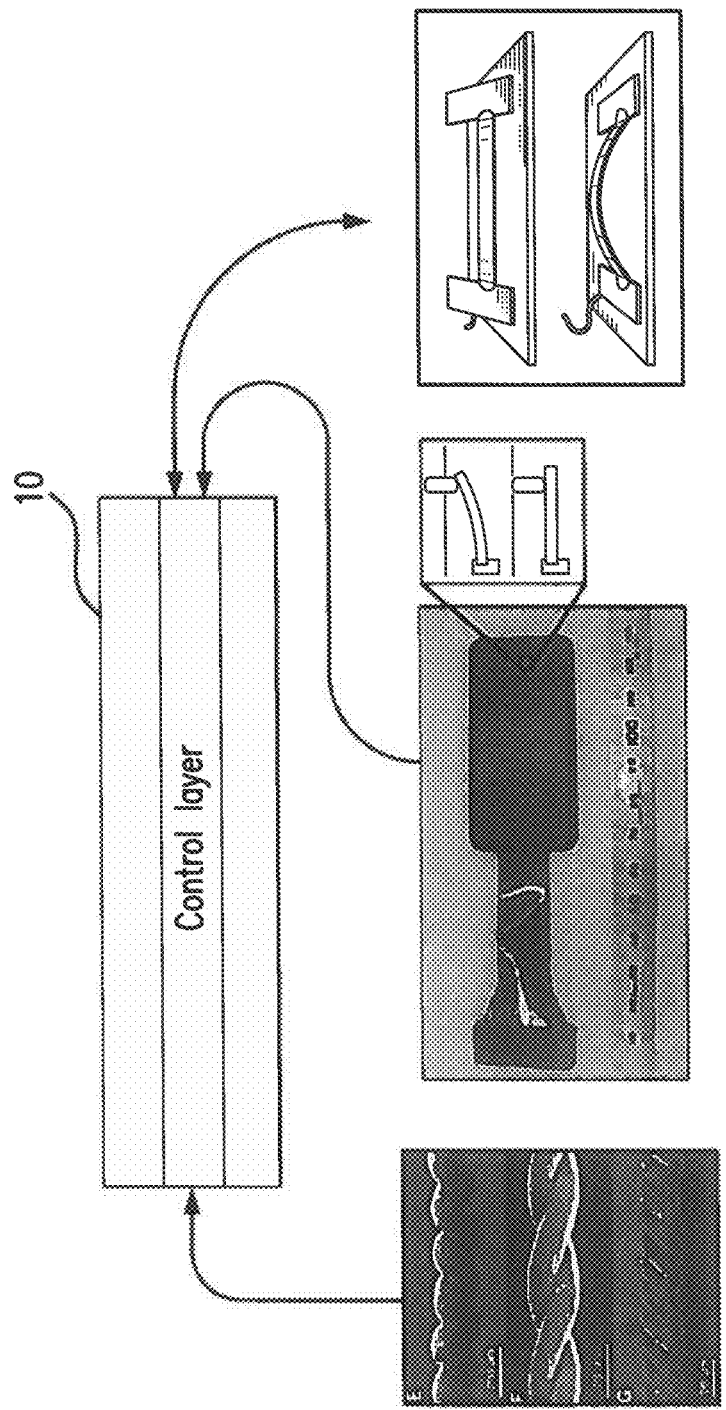

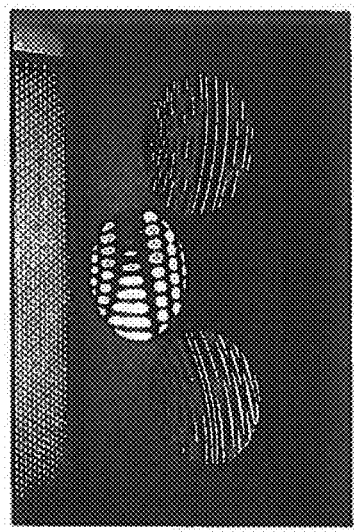
FIG. 11A
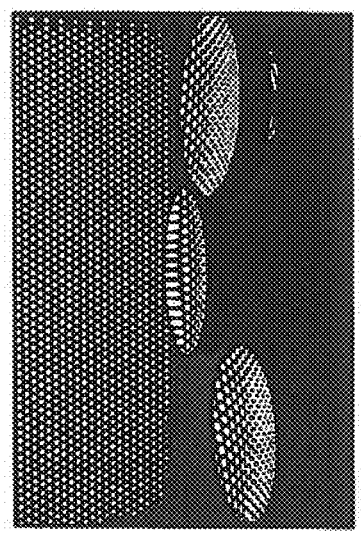
FIG. 11B
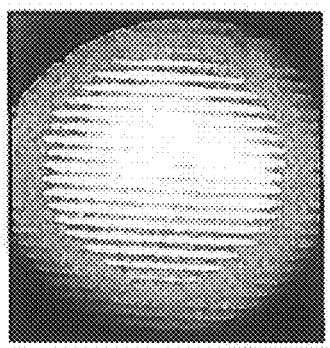
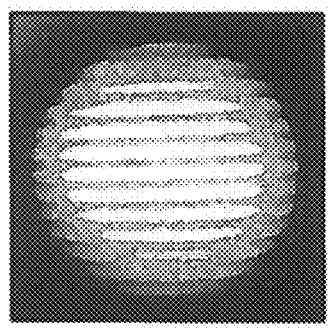
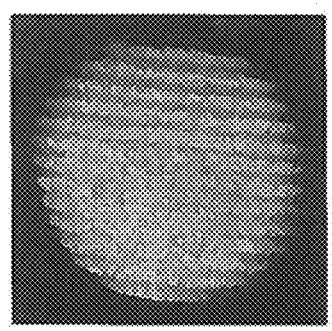
FIG. 11C

HIGH QUALITY TELESCOPE MIRRORS MADE FROM POLYMER MATRIX COMPOSITE MATERIALS AND METHOD

REFERENCE TO RELATED PATENT APPLICATIONS

The present utility patent application is based on the Provisional Patent Application Ser. No. 62/013,619 filed 18 Jun. 2014.

FIELD OF THE INVENTION

The present invention is directed to optical mirrors, and particularly, to fabrication of high quality inexpensive mirrors from nano- and micro-materials embedded in polymer matrix.

More in particular, the present invention is directed to fabrication of new generation ultra-compact and low power smart optics operating in a wide UV-optical-IR range and suited for application in modern large telescopes.

The present invention is also directed to fabrication of lightweight "smart" telescope mirrors with internal sensing and active (or adaptive) configuration control.

The present invention is also directed to polymer matrix composite mirrors having smooth surfaces and high flexibility, and which are easily tailored for numerous external actuation stimuli for controlling configuration as well as a wide range of mechanical, optical and electromagnetic properties.

The present invention is further directed to multilayer high quality optical mirrors with one or more layers performing the sensory and/or actuation functions, i.e. capable of internally produced response to an externally applied actuation so that the mirror may be actively bent (or deformed) in order to counteract the effects of gravity, temperature, wind, moisture, etc. The mirrors are fabricated with embedded electrodes for electric stimuli to be applied thereto to control the shape or other properties of the mirror.

The present invention is also directed to high quality optical mirrors using multiple layers of polymer matrix composite materials, including carbon nanotubes embedded in epoxy for "smart" mirrors which are lightweight, have high stiffness and extremely smooth optical surface. The mirrors may also be manufactured with non-ferrous micro-sized metal particles embedded in epoxy for reliable cryogenic operations, or ferromagnetic micro- and sub-micro-sized materials embedded in epoxy for controlled deformation and steering by external application of electric, magnetic and/or electromagnetic fields.

In addition, the present invention is directed to numerous technological processes (such as, for example, replication, spincasting, and 3-D printing) for manufacturing imaging quality large, lightweight, and flexible optical mirrors with smooth surfaces using nano- and micro-size materials embedded in an epoxy matrix that has sensing capabilities and capable of self-actuation (and self-deformation).

BACKGROUND OF THE INVENTION

Mirrors are optical apparatuses built to reflect, concentrate and/or focus electromagnetic radiation impinging on their surfaces.

Various multilayer mirrors have been developed which are presented, for example, in U. S. Patent Application Publication No. 2006/0141042, U.S. Pat. No. 8,034,263, U. S. Patent Application Publication Nos. 2009/0148095, 2010/0033702, 2012/0162772, 2012/0170012. The mirrors presented in these references are intended either for terrestrial applications or for outer space applications.

For example, U. S. Patent Application Publication No. 2012/0162772 presents that specifically for extra-terrestrial applications, mirrors must withstand harsh environments (such as UV radiation, temperature cycling, temperature gradients, contamination, self-contamination, and the impact of particles impinging on the optical surface). Additional protection buffering layers, as well as layers to balance the coefficient of thermal expansion of the mirror, may be used for extra-terrestrial mirror applications.

U. S. Patent Application Publication No. 2009/0148095 describes electrically and/or magnetically steered arrays using nanowires (formed from a variety of materials including gallium nitride, silicon, silicon germanium, zinc oxide, lead zirconate, titanate, cadmium sulfide, indium phosphide and others). When nanowires are grown, the space therebetween and around is filled, to form a rigid nanowire waveguide structure. The nanowires within the mirror serve as waveguides for optical frequency radiation. By controlling the nanowire waveguide array through illumination with a phase coherent source (such as a laser), a phase delay in the optical frequency beam may be generated at the output of the nanowire waveguide arrays causing the optical frequency beam to deflect upon exiting. Thus, steering of the optical frequency beam may be attained by increasing or decreasing the phase delay of the output optical frequency beam.

Historically, dating from the time of Sir Isaac Newton, telescope making has emphasized rigidity. This meant that, as apertures have increased, the mirrors have become thicker and more massive. This tendency has been carried out to the point where it was no longer effective due to cost, mass, and thermal response times.

Since the 1980s, a new approach has evolved based on the concept of an "active" optics, which is adapted for new generation of telescopes using thin, lighter weight mirrors. Such mirrors are too thin to maintain themselves rigidly in the correct shape. Active optics is a technology used with reflecting telescopes, which actively shapes telescope mirrors to prevent deformation due to external influences such as wind, temperature and/or mechanical stress. Active optics compensates for distorting forces, that change relatively slowly, and roughly on timescales of seconds. The telescope is therefore actively adjusted to keep its optimal shape. In an active system, external sensors and actuators are attached to the back of the mirror to apply dynamic forces to the mirror body to bend or deform the optical surface so as to counteract the effects of gravity, thermal distortion and wind buffering.

Active optics uses a combination of actuators, an image quality detector, and a computer to control the actuators to obtain the best possible image.

One of the tradeoffs in the requirement for a control system employing a large number of external sensors and actuators attached to the mirrors, is the associated high density of wiring harnesses and connectors, and the need for bulky and complex reaction structures.

The modern telescopes use also adaptive optics, which operates on a much shorter timescale (than the active optics) to compensate for atmospheric effects, rather than for mirror deformation. The adaptive optics corrects image distortions due to the atmospheric turbulence using a wavefront sensor measuring the distortions introduced by the atmosphere on the timescale of a few milliseconds. A computer calculates the optimal mirror shape to correct the distortions, and the surface of the deformable mirror is reshaped accordingly.

A deformable mirror (DM) corrects incoming light so that the images appear sharp. The DM usually has many degrees of freedom. Typically, the degrees of freedom are associated with the mechanical actuators. The number of actuators determines the number of degrees of freedom (wavefront inflections) the mirror can correct. Deformable mirrors with large actuator pitch and large numbers of actuators are bulky and expensive.

Numerous concepts of actively and adaptively controlled mirrors have been proposed to compensate for unwanted distortions and effects of gravity, wind, etc. For example, segmented mirrors may be formed by independent flat mirror segments. Each segment can move a small distance back and forth to approximate the average value of the wavefront over the patch area. Unfortunately, these mirrors require a large number of actuators. This concept was used for fabrication of large segmented primary mirrors for the Keck telescopes, JWST, and the future E-ELT. An accurate co-phasing of the segments and reduction of the diffraction patterns introduced by the segment shapes and gaps adds to the complexity and bulkiness of the system.

In addition, continuous faceplate mirrors with discrete actuators may be formed by the front surface of a thin deformable membrane. The shape of the plate is controlled by a number of discrete actuators that are fixed to its back side.

Additionally, magnetics concept mirrors may be fabricated which are based on continuous reflective surface motioned by magnetics actuators.

Furthermore, membrane concept mirrors may be formed by a thin conductive and reflective membrane stretched over a solid flat frame. The membrane can be deformed electrostatically by applying control voltages to electrostatic electrode actuators that can be positioned under or over the membrane.

Ferrofluid concept mirrors have been suggested which are liquid deformable mirrors made with a suspension of small (about 10 nm in diameter) ferromagnetic nanoparticles dispersed in a liquid carrier. In the presence of an external magnetic field, the ferromagnetic particles align with the field, the liquid becomes magnetized and its surface acquires a shape governed by the equilibrium between the magnetic, gravitational and surface tension forces. Using proper magnetic field geometries, any desired shape can be produced at the surface of the ferrofluid. This concept offers a potential alternative for low-cost, high stroke and large number of actuators deformable mirrors.

Despite the progress in the active and adaptive optics, most of the optic systems still use a complicated, bulky and a heavy weight structure requiring an expanded array of external sensors and actuators, and a bulky reaction support, as shown in FIG. 1, to flex the mirrors to control their optical configuration to compensate for unwanted external influences and optical distortions.

In 2008, Dr. Peter C. Chen, astrophysicist of NASA Goddard Space Flight Center, and the inventor of the present system and method, suggested (in http://science.nasa.gov/science-news/science-at-nasa/2008/09jul_moonscope) a concept of using lunar dust to fabricate (directly on the Moon) highly economical telescope mirrors from composite materials, i.e. the synthetic materials made by mixing fibers or granules of various materials into epoxy, and letting the mixture harden. Composites are ultra-lightweight materials which possess extraordinary strength. It was suggested to mix epoxy and a small quantity of carbon nanotubes for fabrication of the telescope mirror. A small telescope mirror was made using a long known technique called spin-casting.

The carbon nanotubes make the composite material a conductor. Conductivity allows a large lunar telescope mirror to reach thermal equilibrium quickly with a monthly cycle of lunar night and day. Dr. Chen also suggested that the conductivity would also allow astronomers to apply an electric current as needed through electrodes attached to the back of the mirror to maintain the mirror's parabolic shape against the pull of lunar gravity as the large telescope was tilted from one portion of the sky to another.

Although suggesting the fabrication of telescope mirrors using carbon nanotube/epoxy which would be uniquely suited for deformable mirrors applications through external stimulus (such as electric current), the fabrication technique suggested was limited to the spin-casting technology, and only to the carbon nanotube/epoxy as a material for the telescope mirror. The publication suggests neither other possible techniques, nor provides specifics of composite materials telescope technologies.

It would be desirable to provide various polymer matrix composite materials suitable for application in deformable "smart" mirrors, as well as various fabrication techniques for manufacturing of flat, as well as curved mirrors with high degree of uniformity which may be actively controlled by external actuation stimuli responsive to internally sensed conditions.

SUMMARY OF THE INVENTION

It is therefore an object of the present invention to provide a fabrication technique for manufacturing high quality optical mirrors from polymer matrix composite materials where appropriate combinations of polymers and various nano- and micro-sized metallic and non-metallic particles and fibers are used where the properties may be tailored to a wide variety of applications, including extraterrestrial applications.

It is another object of the present invention to provide a method for fabrication of "smart" deformable flexible mirrors from polymer matrix composite materials which have one or more properties that may be changed in a controlled fashion by external stimuli, such as stress, temperature, moisture, electric, or magnetic fields.

It is a further object of the present invention to provide high quality optical mirrors with smooth surfaces using carbon nanotubes, or non-ferrous metal particles, or ferromagnetic particles, embedded in epoxy matrix through replication, spin-casting and/or 3-D (dimensional) printing techniques.

In one aspect, the present invention is directed to a method for fabrication of high quality telescope mirrors using one or multiple layers of nano- and micro-material embedded in polymer matrix.

The subject method comprises the steps of forming a liquid mix solution containing at least one filler material (having sensing capabilities and controllable properties) and a polymer material. The filler material may be selected from a group of materials including: multi- and single-wall carbon nanotubes, non-ferrous metal particles, ferromagnetic particles (such as, for example, micron size particles), fibers of carbon, SiC, fiberglass, and their combinations. The polymer material may be an epoxy material permitting a partial curing at the room temperature and a complete curing at an elevated temperature which is higher than normal room temperature.

The method continues by applying to the liquid mix solution a fabrication technique corresponding to the replication process, or spin-casting process, or 3-Dimensional (3-D) printing, and their combinations, to form at least a portion (such as, for example, a initial layer) of the mirror of a predetermined configuration and dimensions.

Upon forming the initial layer of the mirror, curing at the room temperature is carried out for a first predetermined time period (for example, 24-36 hours).

When needed, the preceding steps are repeated until a final configuration and dimensions of the mirror are achieved. For example, the repetition of the preceding fabrication techniques and curing is carried out to increase the thickness of the created layer, or to create multiple layers from the same or different liquid mix solutions.

Subsequently, post-curing of the final configuration mirror is performed at elevated temperatures (for example, 100 F-310 F) for a predetermined time period (for example, 7-10 days) to solidify the polymer material.

A reflective coating is then deposited on at least one surface of the mirror.

When the fabrication technique is selected to be a replication technique, the method includes:
  providing a mandrel having a shape complementary to the predetermined configuration and dimensions of the portion of the mirror (the configuration of the mandrel may be flat, concave or convex shapes, or their combinations,
  attaching to the mandrel a dam structure configured to retain liquid on the surface of the mandrel,
  covering the surface of the mandrel and at least a portion of the dam structure with a mold release compound, and
  placing the liquid mix solution on the surface of the mandrel to form an initial layer of a predetermined thickness. The liquid mix solution may be poured onto the mandrel in a layer of a thickness ranging between 1 and 5 mm.

In further steps, the liquid mix solution is added on the top of the initial layer until the mirror has a multi-layer structure of a required thickness. The multi-layer structure is subsequently post-cured, slowly cooled at ~ less than 3 F per hour, and released from the mandrel. Preferably, an annealing sequence may be applied to the mirror to relieve stress.

During the liquid mix solution formation, a defoaming agent is added to the liquid mix solution, and the liquid mix solution is stirred to attain a uniform dispersion of the material in the epoxy material.

A curing agent is also added to the liquid mix solution at the ratio preferably exceeding 15% wt, and the liquid mix solution is stirred again.

The liquid mix solution is degassed in vacuum to eliminate air bubbles. The degassing procedure may be performed, for example, by mechanical agitation.

Alternatively, the filler material may include, for example, aluminum (Al) powder. For this material, the method includes the following steps:
  forming the crushed Al powder by fine crushing Al in a ball mill for the duration of 7-10 days, thus forming the Al crushed powder with the particles of Al of 20 (or smaller) micron range diameter,
  dispersing the crushed Al powder in ethanol,
  adding 3-aminopropyltriethoxysilane ($C_9H_{23}NO_3Si$) at a concentration of 3-4.2 wt %,
  stirring the resulting solution,
  removing the thus treated Al powder from ethanol,
  rinsing the Al powder with distilled water and acetone in sequence, and
  drying the rinsed Al powder in a vacuum atmosphere.

The weight ratio of the epoxy material to the treated Al powder preferably ranges from 1 to 1.8-3.1.

When the manufacturing technique is selected to be a spin-casting, the subject method is carried out by:
  placing the liquid mix solution in a container of a predetermined size,
  spinning the container at a constant speed until the liquid mix solution is cured, thus forming the portion (layer) of the mirror in a parabolic, predetermined configuration, and
  incrementally placing the liquid mix solution on the cured parabolic portion of the mirror and spinning the container, until a parabolic final configuration of a multi-layer mirror has been attained.

Alternatively, the filler material may include a multi-wall carbon nanotubes (CNT) material. The epoxy material may be a diglycidyl ether of bisphenol-A (DEBGA). For this implementation, the liquid mix solution is subjected to high shear mixing and ultrasonication to de-agglomerate the CNT bundles, and to form a slurry having a substantially uniform dispersion of the CNT in the DEGBA.

When a mirror is fabricated, the final configuration of the mirror may be controllably adjusted by applying, externally to the mirror, at least one control stimuli selected from a group including stress, temperature, moisture, electric field, magnetic field, and combinations thereof. No external actuators are needed with the mirrors fabricated by the subject technique.

As part of the subject method, the contents of the liquid mix solution for at least one additional layer may be altered to form multiple layers of different materials for specific mechanical or electromagnetic, etc., properties. At least one of the layers of the mirror, then may be used as a controlling layer to which a control stimuli is externally applied to control the overall performance of the mirror.

During the process, electrodes may be embedded into the mirror. Preferably, the electrodes may be embedded into one or more layers (control layers) before curing the polymer mixture, and electrical voltages (currents) may be applied to the electrodes prior to polymer curing to form networks of carbon nanotubes. After curing, the mirror shape (and/or other properties) may be changed in a controlled fashion by applying a voltage to the electrodes embedded in the control layer(s), thus attaining active optics or deformable mirror operations.

Another aspect of the present invention is directed to a high quality flexible telescope mirror system which includes at least one layer formed from a filler material embedded and substantially uniformly dispersed in a polymer matrix material. The filler material is selected from a group including carbon nano-tubes, non-ferrous metal with particles of micron and sub-micron dimensions, ferromagnetic material with particles of micron dimension.

In one of the embodiments, the mirror may include a number of the layers formed on each other. At least one control layer may be formed from a filler/polymer matrix composite different than other layers. The control layer(s) may be formed with embedded electrodes. A control stimuli source may be applied to the control layer(s) to adjust their properties, and as the result, the overall properties of the mirror, for example, but not limited to, the configuration and positional orientation of the mirror, or its stiffness.

These and other features and advantages of the present invention will become more apparent subsequent to the reading of further description of the preferred embodiments in conjunction with accompanying Patent Drawings in the current Patent Application.

BRIEF DESCRIPTION OF THE DRAWINGS

FIGS. 3A-3G depict schematically a replication procedure of fabrication of the subject mirror;

FIG. 3H depicts a mandrel in flat, concave and convex configurations usable in the subject replication process;

FIG. 6A-6C are representative of a tentative approach for actuation where the optical configuration of the CNT/E mirror may be adjusted by incorporating a special actuation layer into the mirror body;

FIGS. 11A-11C are representative of three aluminum coated curved mirrors made from the same mandrill (FIG. 11A), the same mirrors are viewed at a different angle (FIG. 11B), and Ronchigrams of the aluminized mirrors shown in FIGS. 11A and 11B.

DETAILED DESCRIPTION OF THE PREFERRED EMBODIMENT

The present invention is useful in fabrication of flexible easily controllable flat and curved optical mirrors from polymer matrix composite materials based on appropriate combinations of polymers and various metallic and non-metallic particles and fibers, metal powders, ferromagnetic materials, and carbon nanotubes (CNT), with properties tailored to a wide variety of applications and which may be adaptively and actively controlled without the need of external actuators or sensors. High quality optics can be fabricated by the subject method with low production cost and high versatility of the resulting product.

The fabrication of imaging quality optical mirrors with smooth surfaces, as presented herein, has been accomplished, and an active figure (configuration) control has been attained in a simple contactless manner requiring neither bulky arrangements of numerous sensors and actuators, nor complicated high density wiring harnesses and connectors, or complex reaction structures.

Additionally, since the precursor is a low density liquid, large and lightweight mirrors may be fabricated by a process such as replication, spin-casting and 3D printing. The subject technology therefore holds promise for development of a new generation of lightweight, compact, "smart" telescope mirrors with configuration sensing and active or adaptive mirror configuration control.

By fabricating optical mirrors from carbon nanotube/epoxy (CNT/E), a multifunctional (or "smart") composite material that has internal sensing capabilities and incorporating self-actuation, optical mirrors for use in many applications including telescope applications has been produced. CNT/E is a combination of carbon nanotube (CNT), which possesses high modules and high electric and thermal conductivity, and an epoxy material (a thermoset polymer that features low density and dimensional stability). CNT/epoxy is a "smart" material with many unique properties. One of its attributes is the ability to sense temperature, strain, and directional deformations.

CNT and CNT/E can be used to make many types of actuators. If the material is used as an optical substrate, the result would be "smart" mirrors with the built-in ability to sense and actuate without the need for external actuator components. The development can potentially lead to a very significant reduction in system mass, complexity, power, and cost, as well as increased compactness and reliability.

Figure 1:
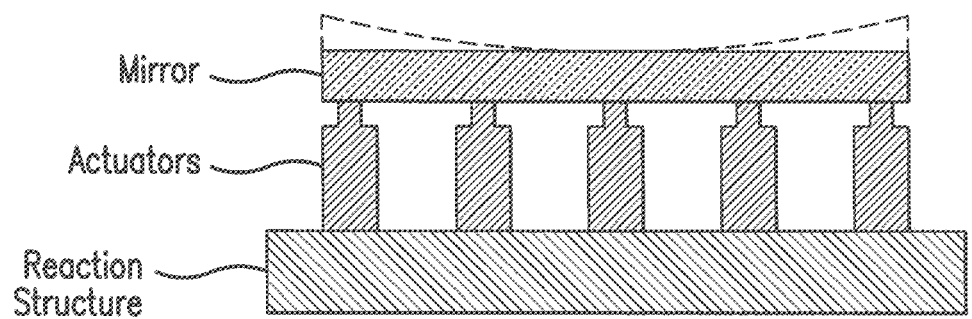
FIG. 1 represents a prior art concept of deformable mirrors using heavy weight and complicated system of mirror actuators.
Figure 2:
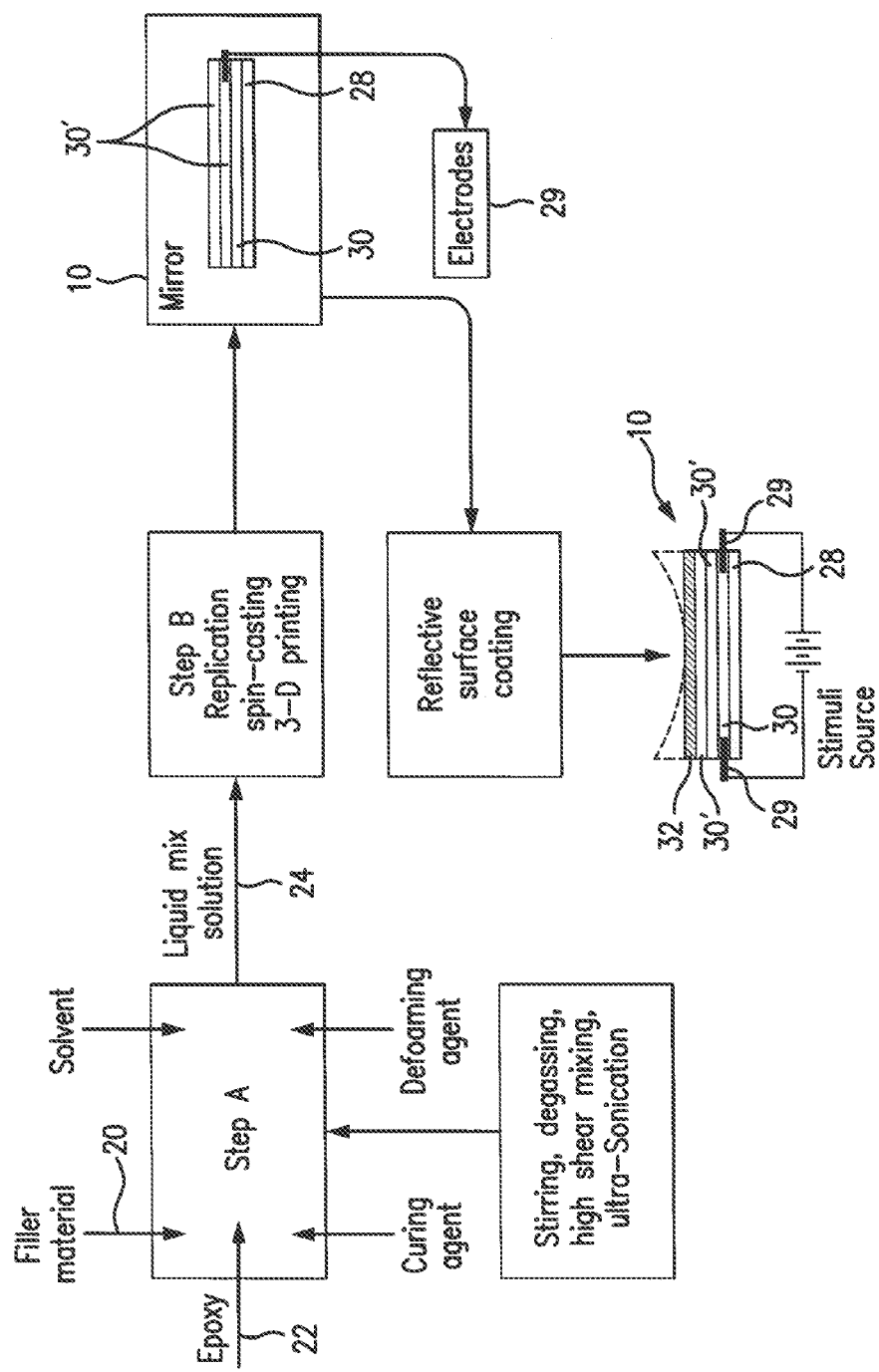
FIG. 2 is a schematic representation of the subject method.

Referring to FIG. 2, showing a schematic representation of the present fabrication concept, in Step A, a liquid mix solution is formed by combining an epoxy material and a filler material. The filler material may be a material selected from a group including carbon nanotubes (CNT), different fibers of carbon, SiC, fiberglass, ferromagnetic particles, non-ferrous metal particles, etc., and their combinations. The epoxy material is a polymer resin which for this particular application can be partially cured at approximately a room temperature, and fully cured at an elevated temperature.

The liquid mix solution is subsequently processed (in step B) in a fabrication process which may be, for example, a replication process, a spin-casting, or 3-D printing, to form a mirror 10, as will be detailed in further paragraphs.

The mirror 10 produced as a result of any one of the fabrication techniques (in step B) is further processed to deposit a reflective coating on its surface, and is substantially ready for operational use in different applications, for example, as a deformable mirror for telescopes. As shown in FIG. 2 (as an example only, but not to limit the scope of the subject invention to this particular implementation), application of electric current (voltage) to the mirror may cause deformation of the initial shape (configuration) of the mirror 10, as required for active control operation.

Referring now to FIGS. 3A-3F, and again to FIG. 2, when the fabrication process is an optical replication process, the process starts with a mandrel preparation. A mandrel 12 may be formed from glass (for example, Borofloat® glass) in a shape complementary to the desired replica (mirror) shape.

As shown in FIGS. 3A-3F, in this exemplary embodiment, the mandrel has a flat configuration. Alternatively, as shown in FIG. 3H, a convex mandrel 12 may be chosen for a desired concave replica, or a concave mandrel 12 may be chosen for a desired convex replica. Any combinations of flat, convex and concave configurations, as well as other alternative shapes for the mandrel are also contemplated in the present system and method.

Prior to use, the mandrel 12 is cleaned, and coated with a mold release compound (also referred to herein as a release agent) 14.

A structure of polyurethane rubber 16 is built around the mandrel 12 to hold liquid. The polyurethane rubber may be made in the shape of a dam with walls 18 extending above the mandrel surface covered with the release agent. The dam is also coated with the mold release compound 14.

Referring to FIGS. 2 and 3B, filler material particulates 20, for example, multi-wall carbon nanotubes, are mixed with diglycidyl ether of bisphenol-A (DEGBA) (which is a chemical compound used as a constituent of epoxy resins) 22, and a solvent. The mixture is subjected to a high sheer mixing and ultrasonication to de-aglomerate the CNT bundles and form a uniform dispersion. The solvent is evaporated by application of heat and vacuum.

Next, the curing agent is added into the mixture and mixed into a slurry 24. After vacuum degassing, the slurry 24, as shown in FIG. 3C, is poured onto the mandrel 12 and subsequently cured (as shown in FIG. 3D), in an oven 26 at a moderate temperature for several days to form an initial layer 28.

The process is repeated (as shown in FIG. 3E) to add more subsequent layers on the top of the initial layer 28 as needed. A number of layers in the mirror 10 is formed to meet the requirements of the final mirror design. For example, a subsequent layer 30 (FIGS. 3F-3G) or any number of further subsequent layers 30 . . . 30' (FIG. 2) may be formed in a repetitive fashion (as shown in FIG. 3E).

After the desired number of layers 30 (30') and a desired thickness of the overall combination of the layers for the mirror have been achieved, an assembly 27 of mandrel 12 and resin is placed in the oven 26 and post-cured, as shown in FIG. 3F. A very slow cooling down during the post-curing (no faster than 3 F/hour) followed by an annealing sequence to relieve stress accumulated in the mirror (also referred to herein as a replica) 10 during the preceding procedures is provided. The entire replication process may continue over a period of several weeks. After final cure, the assembly 27 is removed from the oven 26, and the replica 10 (single- or multi-layer) is released from the mandrel 12, as shown in FIG. 3G.

The mirror 10 may be manufactured with embedded electrodes 29. As presented in FIGS. 2 and 3C-3G during the fabrication process, prior to curing the polymer mix in the oven. The electrodes 29 may be embedded in the initial layer 28 and/or any subsequent layer 30,30', depending on the intended function of the layers in the mirror system. Electrical voltage maybe applied to the embedded electrodes before the polymer curing in order to form networks of carbon nanotubes. After post curing, the mirror may be changed in a controlled manner by applying a voltage (current) to the electrodes 29 of the control layer where the electrodes are embedded, to permit performing the functions of active optics or deformable mirrors.

The manufactured replicated mirrors were measured by interferometry to quantify figure quality and smoothness (root mean square surface micro roughness).

The replication technique presented in FIGS. 3A-3G, was used also for fabrication of the polymer matrix laminate optical mirrors filled with aluminum powder. For mirrors having non-ferrous metal particles suspended in epoxy, the mandrel 12 shaped complementary to the desired replica shape is cleaned, and coated with the mold release compound 14. The dam 16 with walls 18 is built around the mandrel 12 to retain liquid and is also coated with the mode release compound 14.

Further, aluminum powder with particles of size 20 micron diameter or smaller is prepared for use as the filler material. The powder is fine crushed in a ball mill for 7-10 days. The crushed powder is dispersed in ethanol. 3-aminopropyltriethoxysilane ($C_9H_{23}NO_3Si$) at a concentration of 3-4.2% wt is then added and stirred. The treated aluminum powder is removed from the ethanol, rinsed with distilled water, then rinsed with acetone, and the mix is dried in a vacuum oven.

A two part polymer 22 may be used for the optical replication. The polymer is of a type that permits partial curing at or near room temperature, and achieves complete curing when exposed to a higher temperature in the post cure operation. Shown in FIG. 3B, the polymer 22 is mixed with the treated aluminum powder 20. Depending on the type of the resin used, the weight ratio resin:Al powder is between 1 and 1.8-3.1.

A de-foaming agent is added in the mixture of the polymer and treated aluminum powder. The mixture is stirred thoroughly to ensure uniform dispersion of all ingredients in the resin (epoxy).

The curing agent is added at the ratio of stoichiometric+ 15%. The mixture is again mixed very thoroughly.

Subsequently, the mixture is de-gassed in a vacuum chamber to eliminate air bubbles. Mechanical agitation is used during vacuum degassing to prevent fillers from settling out during the operation.

Referring to FIG. 3C, the resulting mixture 24 is poured onto the mandrel 12 (covered with the mold release agent 14) to form an initial layer 28 of a thickness ranging between 1 and 5 mm. The structure of the initial layer on the mandrel is allowed to cure in the oven 26 at or near room temperature over 24-36 hours (as shown in FIG. 3D).

Subsequently, as shown in FIG. 3E, mixing of the polymer with the treated aluminum powder, thorough stirring to ensure uniform dispersion of all ingredients, mixing with the curing agent, degassing in the vacuum chamber, mechanical agitation, and the mixture being poured on the top of the mandrel, are repeated as many times as needed to form a desired numbers of subsequent layer(s) 30 until the desired total thickness of the mirror has been attained. The total thickness required for specific optics depends on the size (aperture) of the piece and the modulus of the materials used.

When all layers (the initial layer 28 and subsequently formed layers 30) have been assembled, the entire assembly 27 (the mandrel 12, holding fixture 16, and layers of resin 28, 30) is placed into the oven 26 (as shown in FIG. 3F) for post curing at a temperature between 160° F.-310° F. for a period of 7-10 days. The oven 26 subsequently is cooled down slowly at a rate of approximately 3° F. per hour (or slower).

After the post cure, the solidified resin piece, also referred to herein as the replica 10, is released from the mandrel 12, as shown in FIG. 3G.

The replica 10 is cleaned of the mold release compound, for example, by wiping with soft tissue soaked with a solvent. The replica 10 is placed into a vacuum enclosure and a reflective coating 32 is deposited thereon, as shown in FIG. 2. This completes the fabrication of a coated replica mirror 10 with aluminum (non-ferrous) particles suspended in the epoxy.

Some mirrors have been also made by spin casting. In accordance to this technique, the liquid slurry made by the same process as described above, is placed inside a container lined on the bottom and sides with polyurethane. The container is placed on a rotary wheel and spun at a constant speed until the resin mixture has cured. The process is repeated to add more layers until the desired thickness and surface quality has been achieved.

As in the replication process, the assembly is then placed in an oven for post-curing and annealing, after which the spin cast optic is removed from the container. In spin-casting, the container size determines the aperture. The shape of the mirror is determined by the placement of the container on the wheel (on-axis or off-axis), and the focal length is determined by the rotational speed.

A large amount of data has been accumulated following the fabrication of the subject optical mirrors.

Experimental Results for CNT/E Mirrors

A number of bar samples were made and measured for density, resonance frequencies, Young's modulus, and Poisson's ratio. Representative results are tabulated in Table 1 and Table 2.

TABLE 1

Bar sample measurements

| Length (mm) | Width (mm) | Height (mm) | Mass (g) | Density (g/cc) |
|---|---|---|---|---|
| 70.80 | 19.74 | 9.77 | 16.22 | 1.19 |

TABLE 2

Bar sample elastic moduli measurements

| $E_{out}(GP_a)$ | $E_{in}(GP_a)$ | $E_l(GP_a)$ | $E_{av}(GP_a)$ | $G(GP_a)$ | $\mu_{out}$ | $\mu_{in}$ | $\mu_l$ | $\mu_{av}$ |
|---|---|---|---|---|---|---|---|---|
| 4.12 | 4.17 | 4.3 | 4.2 | 1.55 | 0.329 | 0.345 | 0.385 | 0.353 |

E = Young's modulus
Subscripts refer to mode of vibration:
out = out-of-plane flexure,
in = in-plane flexure,
l = longitudinal,
av = average
G = shear modulus
$\mu$ = Poisson's ratio Optical Samples CNT/E optical mirrors were fabricated in many sizes, shapes, compositions, constructions, and optical functions. Most samples were optical flats, but a number of curved mirrors have also been made in the shape of spheres, parabolas, and hyperbolas.

Figure 4C:
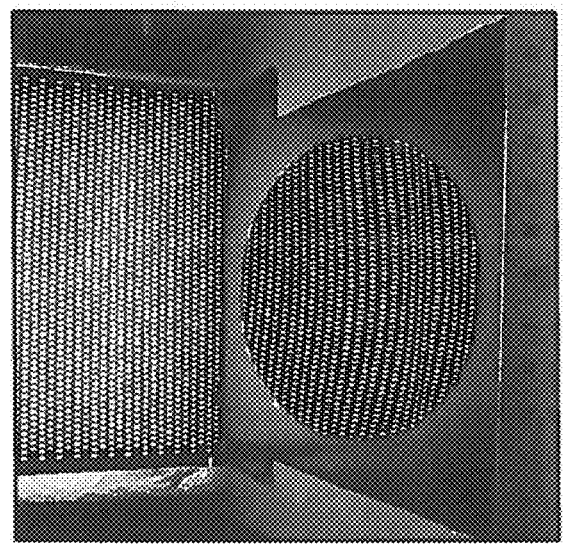
FIGS. 4A-4C depict optical samples in a variety of shapes and sizes
Figure 4B:
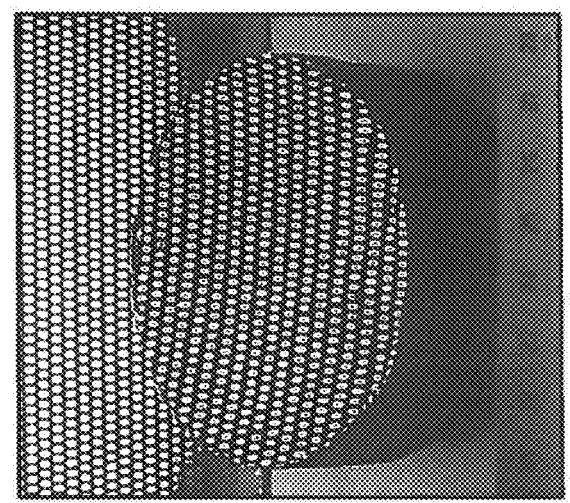
Figure 4A:
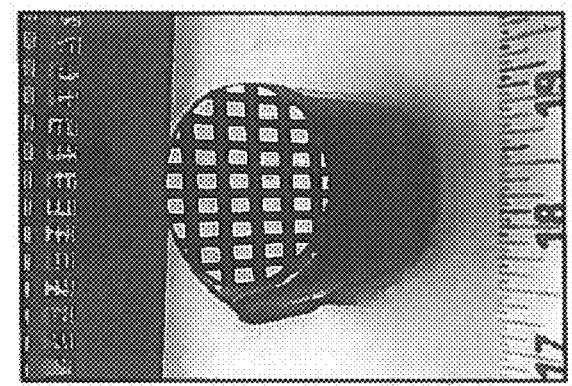

In FIGS. 4A-4C, three samples are depicted showing the reflections of a lighted rectangular hole pattern. FIG. 4A shows a 5 cm in diameter, 1 cm thick optical flat mirror of homogeneous composition. FIG. 4B shows a 20 cm diameter heterogeneous composition mirror with a 3 mm thick facesheet bonded to a 5 cm thick rigid carbon foam backing. FIG. 4C depicts a thin (2 mm) facesheet adaptive mirror of 25 cm in diameter.

Surface Roughness Measurements

The 5 cm replica flat mirror of homogeneous composition was measured at a number of randomly chosen positions using a 4D Technology FizCam 3000 dynamic laser interferometer. The results are listed in Table 3.

TABLE 3

Surface microroughness measurements

| | Center | Edge1 | Edge2 | Edge3 | Edge4 | Mean |
|---|---|---|---|---|---|---|
| P-V(nm) | 117 | 152.1 | 164 | 96.6 | 150.8 | 136.1 |
| RMS(nm) | 4.01 | 3.01 | 4.82 | 3.93 | 2.43 | 3.64 |

The results are representative of manufacturing mirrors having smooth optical surfaces attained at low cost.

Mechanical Properties

The measurements show that CNT/epoxy is a low density material at 1.2 g/cc. The uniformity in the values of the Poisson's ratio and Young's modulus in the three orthogonal directions confirms that the material is homogeneous and isotropic.

The mechanical properties of CNT/E are quite different from traditional optical materials. Compared to aluminum, for example, the Poisson's ratio is about the same, but the Young's modulus is lower by an order of magnitude (4.2 GPa vs 70 GPa). This suggests two possible paths for the development of large telescope mirrors:

a. Increase the stiffness of the material, or
b. Take advantage of the low modulus (=low actuation force) material to make optics that can be either active (global figure adjustment, low order Zernike terms) or adaptive (local figure adjustment, higher order Zernike terms).

Optical Figure Accuracy

The measurements with a Zygo interferometer reveals that the replica deviates from a perfect flat by a p-v (peak to valley) value of $4.4\lambda$ and by rms value of $0.9\lambda$ (at 632.8 nm). The corresponding values for the glass mandrel are $0.15\lambda$ and $0.01\lambda$, respectively. The largest contribution to the figure error is a power term of amplitude $3.0\lambda$. In a curved optic this term represents a small change in focal length which can usually be neglected. Subtracting this term, the residual rms error may be reduced to $0.1\lambda$.

Epoxies shrink as the process of polymerization takes place. Heating, which is required to bring to completion the many chemical reactions inherent in a thermosetting polymer, may cause additional cure shrinkage as does the subsequent cool down.

The presence of fillers (in this case CNT and other additives) serves to counteract this shrinkage. The power term therefore suggests that there is still a small amount of residual shrinkage in the replica with respect to the mandrel. It was noted that the power term is spherically symmetric, indicating that the shrinkage is isotropic and hence confirming again that the material has good uniformity.

Surface Smoothness

The surface rms microroughness is a measure of the surface texture at high spatial frequencies (nanometers to millimeters). This parameter quantifies the ability of an optical system to resolve point sources that are closely spaced.

As seen from Table 3, the average value measured at six points on the CNT/E mirror is about 36 Å. The averaged value of six points measured at random on the glass mandrel is 6.0 Å. The difference suggests either that, once again, the fabrication process possibly indicates that the presence of carbon nanotubes contributes to the increase in surface roughness. The 36 Å value was noted in the mid-range of polished glass surfaces. CNT/E in its present state therefore appears to be sufficiently smooth for most telescopic applications.

CNT/E as an Optical Material

Mirrors may be fabricated by replication, spincasting, and 3D printing. In particular, it is noted that spincast epoxy mirrors without CNTs have been made and used successfully by Neugebauer and Leighton (M. Harwit, Astrophysical Journal, 525, pp. 1063-1064, 1999), and parabolas as large as 10 m have been made (F. Schmidt, "Electroforming of Large Mirrors", Appl. Opt., 1996, v. 6, No 5, pp. 719-725).

The multilayer construction, plus the ability to change the composition and thickness of each layer, permits an almost infinite number of configurations. If it is desired to increase the stiffness of the mirror substrate, one can, for example, employ single wall CNTs, vary the diameter and length/diameter ratio of CNTs, functionalize the nanotubes to enhance bonding to the matrix, use special processing procedures and/or coupling agents, or incorporate micro- or macro-size fillers to make multi-scale composite structures.

Implementing Active Optics

The low modulus of CNT/E suggests that active figure (configuration) control in CNT/E mirrors would not require the high force, high power, and usually massive actuators typical of other mirror technologies. In fact, with the appropriate construction, external components may not be required at all.

An active optics system requires the ability to sense changes and to actuate adjustments. For CNT/E the sensing function is a built-in function due to the ability of the CNT to sense.

Temperature and strain can be monitored by measuring the resistance at various points in the substrate, without the use of external sensors. Actuation may be effected by heat taking advantage of the ability of CNT/E to function as a heating element. Alternatively, specifically designed actuation layers can be added into the mirror substrate. Such a layer can contain, for example, embedded shape memory alloy wires, CNTs aligned by mechanical, electrical, or magnetic means or CNT yarns, as well as piezoelectric fibers.

In summary, CNT/E is a low density material capable of providing a 1$\lambda$, rms optical figure and 40 Å rms surface microroughness.

The uniformity of the measured roughness frequencies in three orthogonal directions, and the good agreement between observed and computed values, show that the material is homogeneous and isotropic.

The relatively low modulus of elasticity (compared to traditional optical materials) suggests that active figure control in CNT/E may be accomplished with low force requirements. There appear to be numerous ways to implement self-sensing functions and embedded actuators into the mirror substrate.

It is possible to make imaging quality mirror surfaces based on carbon nanotube epoxy composites. The material is homogeneous and isotropic, and has low density. The low modulus of elasticity shows that active figure control can be accomplished with low force and hence low power actuators. CNT/E is therefore a promising technology for making lightweight, ultra-compact active telescope mirrors with embedded sensing and actuation.

Since the fabrication starts with a liquid slurry, novel processes of making telescope mirrors become possible including optical replication, spincasting, and 3D printing.

Figure 5A:
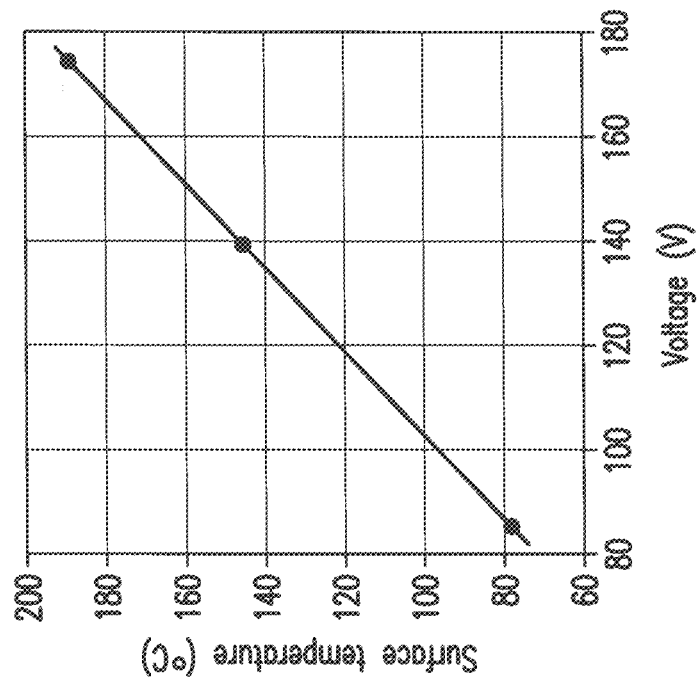
FIG. 5A is a graph representative of the temperature of the CNT/E mirror sensed by measuring its resistance.
Figure 5B:
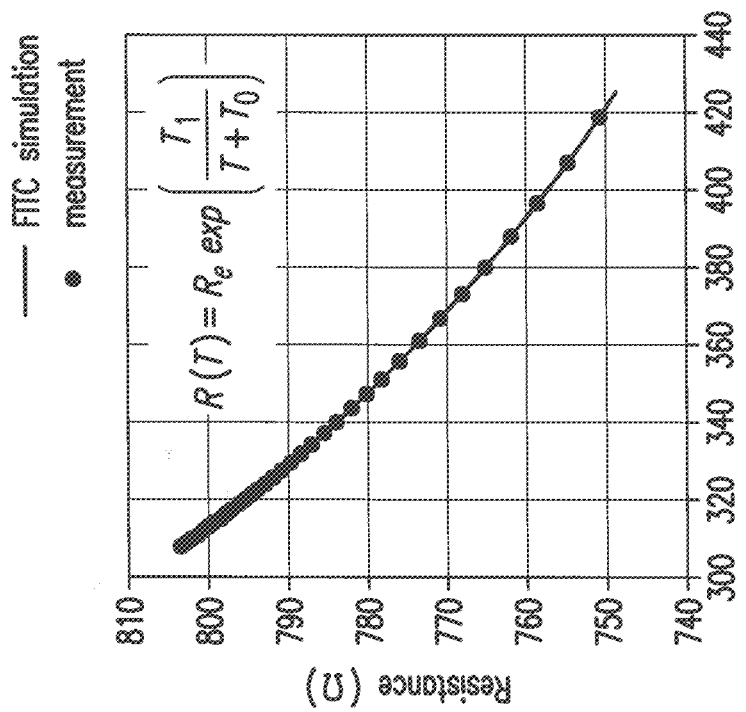
FIG. 5B is a graph representative of changing of the optical configuration by applying voltage to the CNT/E mirror.

FIGS. 5A and 5B represent graphs which prove that carbon nanotube-epoxy can be used as a "smart" material. For example, in FIG. 5A, the temperature of the CNT/E can be sensed by measuring its resistance, thus providing that carbon nanotube/epoxy material is very well suited for sensing. In FIG. 5B, it is shown that applying power to the CNT/E causes heating, thermal expansion, and change in optical configuration, thus proving that carbon nanotube epoxy is very well placed for actuation purposes.

Different methods of actuation may be used for the manufactured mirrors due to the fact that "smart" materials, such as carbon nanotube in epoxy, have one or more properties (such as shape, stiffness, viscosity, etc.) that can be significantly changed in a controlled fashion externally. For example, externally applied stress, temperature, moisture, electric or magnetic fields, electromagnetic fields may be used to control the deformation of the mirrors in question. As shown in FIGS. 6A-6C, the optical configuration of the CNT/E mirrors may also be adjusted by incorporating a special actuation layer into the mirror body. For example, as shown in FIG. 6A, electrically activated artificial "muscle" fabricated of woven carbon nanotube (CNT) yarns may be included in the subject mirror to be controlled for changing the properties of the entire mirror. Shown in FIG. 6B, a commercial actuator using CNT in anionic polymer also may be embedded in the subject mirror. A time lapse photo (FIG. 6C) shows bending of CNT bimorph, which also may be used in the mirrors produced in accordance with the subject method. The property of the CNT/E to change the shape when external stimuli is applied places the CNT/E material in a good position for application in the mirrors, for example, as an actuator layer incorporated in the mirror body.

Figure 7A:
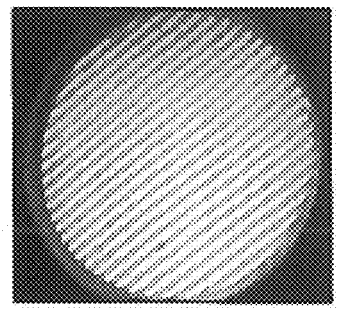
FIG. 7A is a interferogram of a mandrel used for fabrication of the subject mirror.
Figure 7B:
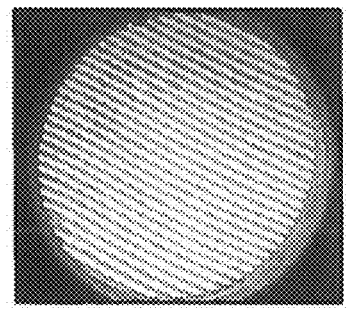
FIG. 7B is the interferogram of the nano-composite replica mirror.

Comparison of the interferogram of the mandrel (FIG. 7A) and the interferogram of nano-composite replica mirror (FIG. 7B) shows that high quality supersmooth surfaces nano-composite mirrors have been produced. The accuracy in FIGS. 7A-7B is approximately 0.1$\lambda$. The surface of the produced mirrors is extremely smooth with approximately 5 Å rms which is a good quality at far lower cost than other methods.

Figure 8A:
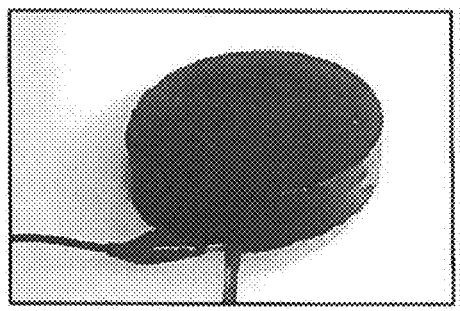
FIGS. 8A-8B are representative of the experimental setup for voltage application to the manufactured mirror, and shows
Figure 8B:
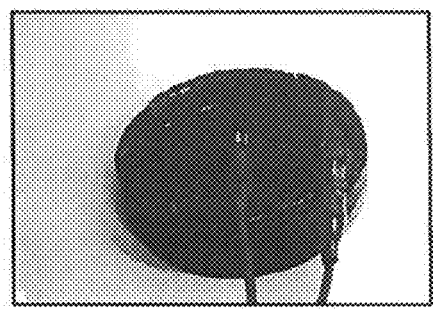
Figure 8C:
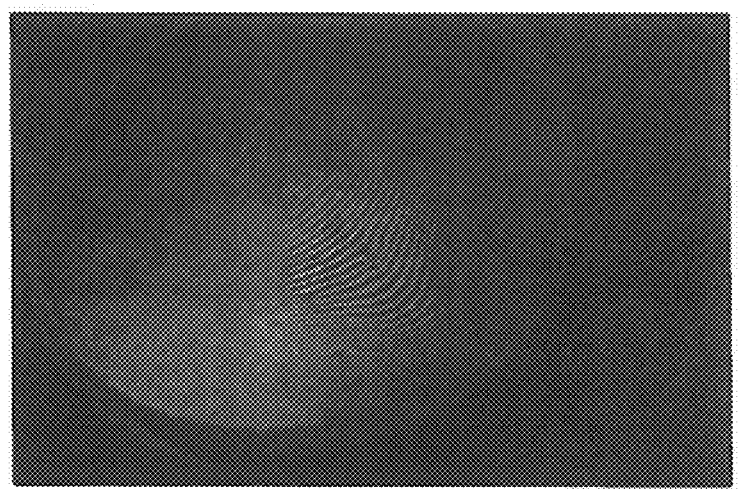
FIG. 8C shows the deformation produced by the voltage application.

When voltage is applied to the produced mirrors (FIGS. 8A-8B), the deformation of the mirror (FIG. 8C) takes place. Thus, the subject technology proves to be well suited for smart deformable mirrors.

Figure 9:
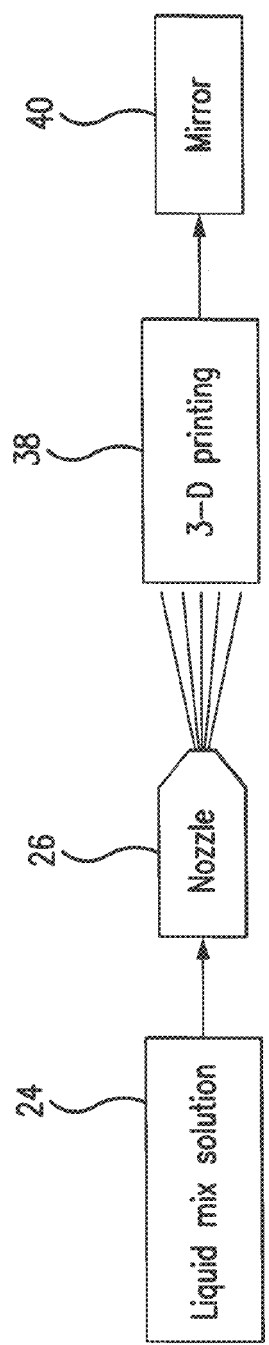
FIG. 9 is a conceptual block diagram of the subject process using 3-D printing to produce the high quality mirrors.
Figure 10A:
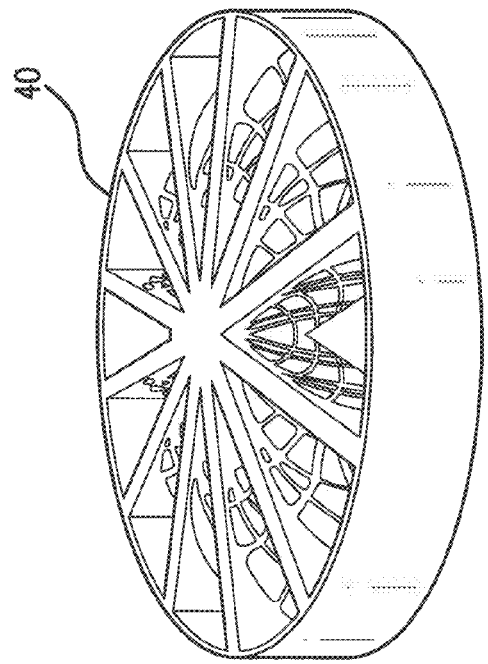
FIG. 10A-10B are exemplary preliminary designs of 3-D printed nano-composite mirrors.
Figure 10B:
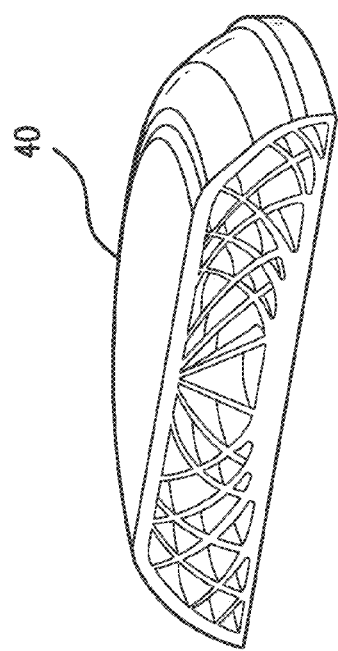

As presented in FIG. 9, due to the liquidity of the mixture solution used in the present fabrication process, the process is well suited for 3D printing. After the liquid mix solution 24 is prepared (as presented in previous paragraphs), it may be supplied into the nozzle 36 so that the spray of the liquid mix 24 is further processed in the 3D printing equipment 38 to form 3D printed nanocomposite mirrors 40 of numerous shapes. Mirrors and optical systems in a variety of configurations may be fabricated from the subject mixture of carbon nanotubes embedded in epoxy, or ferromagnetic/epoxy mixtures, or non-ferrous metal particles/epoxy mixtures, for example, as shown in FIGS. 10A and 10B.

Metal Powder Optics (Flat)

The constituents of these mirrors are micron and submicron size metal powders, surfactants, and additives. The filler material is very low cost, easy to work with, yields excellent optical figures, and is stable under low temperatures.

Interference fringe pattern of a 5 cm diameter replica was compared with a reference optical flat viewed under light from a sodium vapor lamp (589.3 nm). The interference pattern of the mandrel was substantially identical to the reference flat. There was an insignificant difference between the two, indicating a high degree of accuracy in the replication process. Limiting factors may be the sizes of available precision mandrels and capacity of curing ovens.

Metal Powder Optics (Curved)

FIGS. 11A-11B show three 11.4 cm f/1.2 aluminized telescope mirrors made from the same mandrel. The samples are a subset of the several dozen replicas made using the same glass mandrel. FIG. 11C represents Ronchigrams of the three mirrors.

The optical figures are seen to be excellent. This is an illustration of the ability of the replication process to make multiple identical units.

Cryogenic Testing of Metal Powder Mirrors

A test was performed on a 7.5 cm flat to verify stability of the optical surface under cryogenic conditions. The lowest test temperature recorded by a computer controlled thermocouple was −125 C (148K). The interference fringe pattern (@ 589.3 nm) of the flat before (a) and after (b) cooling were substantially identical.

The measured rms wavefront errors were 0.52λ and 0.47λ, respectively (λ=589.3 nm). There is no discernible change in the optical figure within experimental error limits. Metal powder mirrors are therefore stable after cooling to cryogenic temperatures.

Ferromagnetic Mirrors

Figure 12:
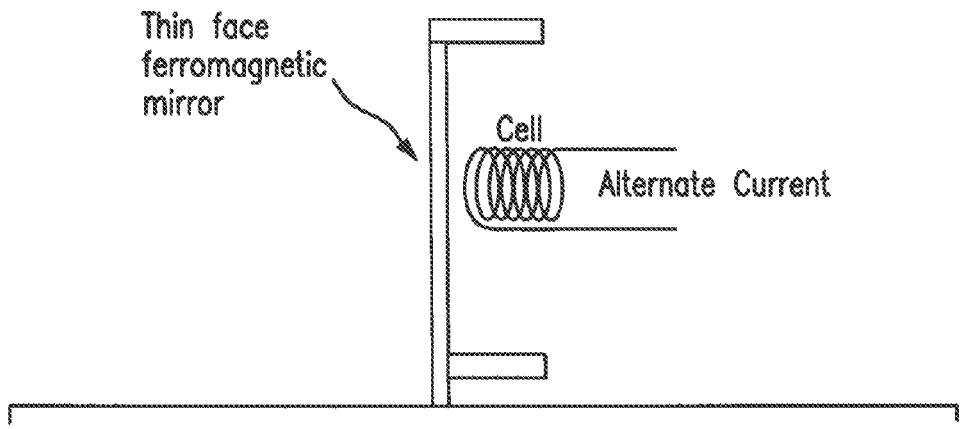
FIG. 12 is a conceptual design of a thin continuous surface deformable (adaptive) mirror actuated by non-contact means, such as voice coils.

Mirrors have been fabricated with a layer of micron sized iron powder dispersed within the polymer matrix. Some applications of this technology may include:
(a) Mounting telescope optics or structures under special circumstances where the use of conventional mechanisms is difficult or inapplicable.
(b) A new type of active optics wherein the optical figure can be adjusted with the use of magnet or magnet coils.
(c) A new type of deformable mirror consisting of a large thin continuous optical surface made of polymer matrix composite material. The shape of the surface may be actuated at high speed and in a non-contact manner via an array of voice coils, as shown in FIG. 12.

Optics with Very Smooth Surfaces Made by Replication

The surface rms microroughness is a measure of the surface texture at high spatial frequencies (nanometers to millimeters). This parameter quantifies the ability of an optical system to resolve point surfaces that are closely spaced. The subject technique permits fabrication of multilayer nano-composite mirrors with very smooth surfaces.

Figure 13:
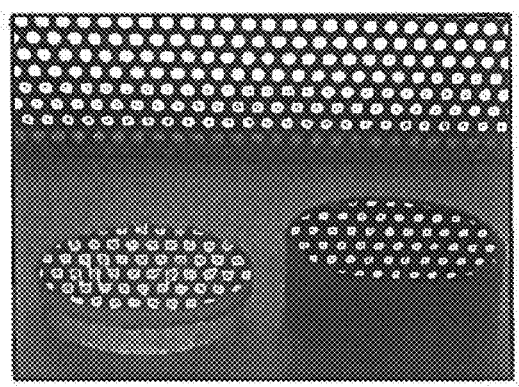
FIG. 13 shows a 5 cm super smooth glass flat (left) and a multi-layer composite replica (right).

FIG. 13 shows a mandrel-replica pair. The mandrel is a thin glass window made of Borofloat® glass. Measurements were taken at randomly chosen points on both optic using a 4D Technology FizCam 3000 dynamic laser interferometer.

The results of the measurements show that the multilayer composite replication technique is capable of reproducing surfaces that qualify as "supersmooth". An important point to note is that the mandrel material is float glass, which is commercially available as ordinary window glass at sizes up to several meters. Composite technology therefore has the potential to make medium aperture (~3 m) mirrors with flat or low curvature (long focus) optical figures and super-smooth surfaces at very low cost.

Optics with Very Smooth Surfaces Made by Spincasting

Special polymer formulations have been developed to yield a very smooth surface when used with spincasting. A 20 cm mirror was fabricated by pouring resin into a container and letting it cure slowly in a carefully controlled environment. The surface measurements made by a Zygo Mirau microscope interferometer showed rms microroughness of less than 4 Å.

The subject techniques generate high precision optical figures without compromising the surface microroughness. This is a powerful technique for making large aperture, fast mirrors with supersmooth surfaces.

Active optics is potentially a very fruitful area of development for polymer matrix optical technology. Modern large telescopes employ thin mirrors that are designed to be flexible. A system of external sensors and actuators are attached to the back of the mirror to bend or deform the optical surface so as to counteract the effects of gravity, temperature, and wind. Polymer matrix composite mirrors are well suited for this application, in the following ways:

a. External actuation: Mirror properties can be tailored for specific actuators in terms of compliance, force or bending moment, excursion, or thermal conductivity (for thermal actuation). The multi-layered construction gives the designer the ability to fabricate mirrors and substrates with a very wide range of mechanical, optical, and electromagnetic properties. Thus for example if a mirror with stiff substrate is desired, one can incorporate fibers of carbon, SiC, fiberglass, single wall carbon nanotubes, etc.

If, on the other hand, a more compliant material is desired, one can employ shorter fibers, increase the proportion of the polymer, and make thinner layers. In fact, an almost infinite number of different configurations can be made by varying the total number of layers, order of layers, thickness of each layer, composition of each layer, and curing conditions (type and proportion of curing agents, temperature, pressure, duration, etc.). Polymer matrix composite active mirrors are therefore a promising field for future development.

b. Internal actuation: Mirrors can be constructed so that one or more layers can perform the functions of sensing and actuation. For example, a layer can incorporate carbon nanotube epoxy (CNT/E), a so-called "smart material" whose temperature and strain can be monitored by measuring its electrical resistance. Actuation can be effected by heat, taking advantage of the ability of CNT/E to function as a heating element. Alternatively, specifically designed actuation layers may be added into the substrate. Such a layer can contain, for example, embedded shape memory alloy wires, CNT yarns, or piezoelectric fibers. The technology therefore promises to make available a new generation of low power and ultra-compact active optics.

3D printing offers yet another promising development path. 3D printing, or additive manufacturing, is a process of making a three-dimensional solid object from a digital model. The printer dispenses material through a nozzle to lay down successive layers in different shapes. Very complex structures may be made in this fashion. Since polymer matrix composites start out as a slurry, the material is adaptable to 3D printing. It should be possible to design and fabricate telescope parts and structures from composites materials. Polymer matrix composites technology therefore offers the prospect of making a thermal telescopes wherein the optics and structures are made of the same materials.

Although this invention has been described in connection with specific forms and embodiments thereof, it will be appreciated that various modifications other than those discussed above may be resorted to without departing from the spirit or scope of the invention as defined in the appended claims. For example, functionality equivalent elements may be substituted for those specifically shown and described, certain features may be used independently of other features, and in certain cases, particular locations of elements, steps, or processes may be reversed or interposed, all without departing from the spirit or scope of the invention as defined in the appended claims.

What is claimed is:

1. A method of fabrication flexible high quality telescope mirrors, comprising the steps of:
   (a) forming a liquid mix solution containing at least one filler material and a polymer material, wherein said at least one filler material is selected from the group including: carbon nanotubes (CNTs), non-ferrous metal particles, ferromagnetic particles, and respective combinations thereof, and wherein said polymer material includes an epoxy (E) material permitting a partial curing at a first temperature and a complete curing at a second temperature higher than said first temperature;
   (b) exposing said liquid solution to a technique selected from the group consisting of: replication process, spin-coating process, 3-Dimensional (3-D) printing, and respective combinations thereof, to form an initial portion of the mirror of a predetermined configuration and dimensions;
   (c) miring said initial portion of the mirror at said first temperature for a first predetermined time period;
   (d) repeating said steps (b) and (c) to form at least one subsequent portion of the mirror covering said initial portion until a final configuration and final dimensions of the mirror are achieved, wherein at least one of said initial portion and said at least one subsequent portion is a control portion;
   (e) post-curing said mirror at said second temperature for a second predetermined time period to solidify said polymer material;
   (f) in at least one of said steps (b) and (d), prior to said steps (c) and (e), respectively, embedding electrodes into said liquid mix solution of said control portion of said mirror, and applying electrical stimuli to said electrodes embedded in said control portion to control properties of said filler material in said liquid mix solution prior to solidification of said control portion of said mirror;
   (g) depositing a reflective coating on at least one surface of the mirror; and
   after said step (e), applying at least one control stimuli signal to said embedded electrodes of said control portion to control performance of said mirror.

2. The method of claim 1, wherein said technique is a replication technique, further comprising the steps of:
   prior to said step (b), providing a mandrel having a shape complementary to said predetermined configuration and dimensions of said initial portion of the mirror;
   attaching to said mandrel a dam structure configured to retain liquid on at least one surface of said mandrel;
   covering said at least one surface of said mandrel and at least a portion of said dam structure with a mold release compound;
   in said step (b), placing said liquid mix solution on said at least one surface of said mandrel to form said initial portion configured as an initial layer of a predetermined thickness;
   in said step (d), adding said liquid mix solution to said initial layer until said mirror has a multi-layer structure of a required thickness; and
   after said step (e), releasing said multi-layer structure from said mandrel.

3. The method of claim 1, further comprising the steps of:
   in said step (d), changing the contents of said liquid mix solution for said at least one subsequent portion of the mirror.

4. A method of fabricating flexible high quality telescope mirrors, comprising the steps of:
   (a) forming a crushed Al powder by fine crushing aluminum (Al) for the duration of 7-10 days, thus forming the crushed powder containing particles of Al of 20 micron or less in diameter,
   (b) dispersing id crushed Al powder in ethanol,
   (c) adding 3-aminopropyltriethoxysilane ($C_9H_{23}NO_3Si$) at a concentration of 34.2 wt %,
   (d) stirring the resulting solution,
   (e) removing Al powder from ethanol, thus obtaining a treated Al powder,
   (f) rinsing the treated Al powder with distilled water and acetone sequence, and
   (g) drying the rinsed Al powder in a vacuum atmosphere;
   (h) forming a liquid mix solution containing at least one filler material and a polymer material, wherein said at least one filler material includes said treated Al powder, and wherein said polymer material includes an epoxy material permitting a partial curing at a first temperature and a complete curing at a second temperature higher than said first temperature;
   (i) exposing said liquid mix solution to a technique selected from the group consisting of: replication process, spin-coating process, 3-Dimensional (3-D) printing, and respective combinations thereof, to form an initial portion of the mirror of a predetermined configuration and dimensions;
   (j) curing said initial portion of the mirror at said first temperature for a first predetermined time period;
   (k) repeating said steps (b) and (c) to form at least one subsequent portion of the mirror covering said initial portion until a final configuration and final dimensions of the mirror are achieved; and
   (l) post-curing said mirror at said second temperature for a second predetermined time period to solidify said polymer material.

5. The method of claim 4, wherein in said step (h), the weight ratio of said epoxy material to said treated Al powder ranges from 1 to 1.8-3.1.

6. The method of claim 1, further comprising the steps of:
   in said step (a), adding a de-foaming agent to said liquid mix solution, and stirring said liquid mix solution to attain a uniform dispersion of said at least one material in said epoxy material,
   adding a curing agent at the ratio exceeding 15% wt to said liquid mix solution, and
   stirring said liquid mix solution.

7. The method of claim 6, further comprising the step of:
   in said step (b), degassing said liquid mix solution in vacuum to eliminate air bubbles.

8. The method of claim 2, wherein in said step (b), said liquid mix solution is poured onto said mandrel to form said initial layer of a thickness ranging between 1 and 5 mm.

9. The method of claim 1, further comprising the steps of:
   prior to said step (c), embedding electrodes in said initial portion of said mirror.

10. The method of claim 2, wherein in said step (c), said first temperature is approximately a room temperature, and said first predetermined time period ranges from 24 hours to an excess of 36 hours;
   wherein in said step (e), said second temperature ranges between 100 F and 310 F, and said second predetermined time period ranges between 7 days and 10 days; and
   wherein after said step (e), said mirror is cooled at a rate not exceeding 3 F per hour.

11. The method of claim 2, wherein said predetermined configuration of said mandrel selected from the group including flat, concave and convex shapes, and combinations thereof.

12. The method of claim 2, further comprising the step of:
prior to said step (g), removing said mold release compound from the mirror with a solvent.

13. The method of claim 1, wherein said technique is a spin-casting, further comprising the steps of:
in said step (b), placing said liquid solution in a container of a predetermined size,
spinning said container at a constant speed until said liquid mix solution is cured, thus forming said initial portion of the mirror in a parabolic configuration, and
in said step (d), incrementally placing said liquid mix solution on said cured parabolically shaped initial portion of the mirror and spinning said container, until a parabolic final configuration of said mirror has been attained.

14. The method of claim 1, wherein said at least one filler material includes multi-wall carbon nanotubes (CNT), and wherein said epoxy material includes a diglycidyl ether of bisphenol-A (DEBGA), further comprising the step of:
in said step (a), exposing said liquid mix solution to high shear mixing and ultrasonication to de-agglomerate said CNT bundles, and to form a substantially uniform dispersion of the CNT in said DEGBA.

15. The method of claim 10, further comprising the step of:
after said cooling performed after said step (e), applying an annealing sequence to said mirror to relieve stress.

16. The method of claim 14, further comprising the steps of:
after said step (g), applying externally to said mirror at least one control stimuli selected from the group including: stress, temperature, moisture, electric field, magnetic field, electromagnetic field, and combinations thereof, thereby controllably deforming said final configuration of said mirror.

17. The method of claim 16, wherein said at least one filler material includes CNT, further comprising:
in said steps (b) and (d), applying the electrical stimuli to said embedded electrodes prior to the CNT/E curing performed in said steps (c) and (e) to form networks of the carbon nanotubes therein; and
forming in said step (d), a plurality of said subsequent portions of the mirror.

18. The method of claim 1, wherein said at least one filler material includes iron powder with powder particles sized in micrometer range below 20 μm.

19. A high quality flexible telescope mirror system, comprising:
at least one layer formed from a composite material containing at least one filler material embedded and substantially uniformly dispersed in a polymer matrix material, wherein said at least one filler material is selected from a group including: carbon nano-tubes (CNTs), non-ferrous metal material, ferromagnetic material, and combinations thereof;
a plurality of electrodes embedded in said at least one layer, each of said electrodes extending, at one end thereof, into the material of said at least one layer; and
a control stimuli source applied to said embedded electrodes to control properties of the mirror, wherein said controlled properties of said mirror include at least one property selected from the group including: configuration, stiffness and positional orientation; and
wherein, when said at least one filler material is formed with carbon nanotubes (CNTs), the application of said control stimuli to said embedded electrodes results in formation of networks of the carbon nanotubes in said at least one layer.

20. The high quality flexible telescope mirror system of claim 19, wherein said mirror includes a plurality of said layers formed one on top of another, wherein at least one layer of said plurality of layers is being formed as a control layer from a filler/polymer matrix composite material different than at least another layer, and
wherein said control stimuli source is operatively coupled to said plurality of electrodes embedded in said at least one control layer to control the properties of said at least one control layer.

* * * * *